United States Patent
Jiao et al.

(10) Patent No.: US 12,271,326 B2
(45) Date of Patent: Apr. 8, 2025

(54) DATA FLOW-BASED NEURAL NETWORK MULTI-ENGINE SYNCHRONOUS CALCULATION SYSTEM

(71) Applicant: Shenzhen Corerain Technologies Co., Ltd., Guangdong (CN)

(72) Inventors: Li Jiao, Guangdong (CN); Yuanchao Li, Guangdong (CN); Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 65 days.

(21) Appl. No.: 18/011,528

(22) PCT Filed: Jun. 4, 2021

(86) PCT No.: PCT/CN2021/098289
§ 371 (c)(1),
(2) Date: Dec. 20, 2022

(87) PCT Pub. No.: WO2021/259040
PCT Pub. Date: Dec. 30, 2021

(65) Prior Publication Data
US 2023/0305976 A1  Sep. 28, 2023

(30) Foreign Application Priority Data
Jun. 22, 2020 (CN) .......................... 202010574436.7

(51) Int. Cl.
*G06F 13/28* (2006.01)
*G06F 12/0897* (2016.01)

(52) U.S. Cl.
CPC .......... *G06F 13/28* (2013.01); *G06F 12/0897* (2013.01)

(58) Field of Classification Search
CPC ............................ G06F 13/28; G06F 12/0897
USPC .......................................................... 710/22
See application file for complete search history.

(56) References Cited

U.S. PATENT DOCUMENTS

| | | | |
|---|---|---|---|
| 2014/0075408 A1* | 3/2014 | Korat | G06F 9/4494 |
| | | | 717/104 |
| 2017/0169326 A1* | 6/2017 | Diamos | G06N 3/088 |
| 2018/0307984 A1* | 10/2018 | Koker | G06N 3/08 |
| 2018/0307985 A1* | 10/2018 | Appu | G06N 3/084 |
| 2018/0314936 A1* | 11/2018 | Barik | G06N 5/01 |
| 2019/0042935 A1* | 2/2019 | Deisher | G06N 3/044 |
| 2019/0171932 A1* | 6/2019 | Chen | G06N 3/045 |

(Continued)

*Primary Examiner* — Titus Wong

(57) ABSTRACT

A data flow-based neural network multi-engine synchronous calculation system, include: a plurality of calculation engines each including a plurality of calculation modules and at least one cache module located at different layers, and each calculation module is configured to calculate an input calculation graph provided by the cache module or the calculation module of a previous layer of a layer where each calculation module is located, so as to obtain an output calculation graph; and at least one synchronization module each being configured to monitor the data amount of the input calculation graph stored by the cache module on the same layer in each calculation engine, and control, when the data amount reaches a preset value corresponding to each cache module, each cache module on the same layer to output the stored input calculation graph to the calculation module on a next layer.

7 Claims, 2 Drawing Sheets

(56) References Cited

U.S. PATENT DOCUMENTS

| | | | | |
|---|---|---|---|---|
| 2019/0205745 A1* | 7/2019 | Sridharan | ............ | G06F 9/5061 |
| 2019/0347559 A1* | 11/2019 | Kang | ............ | G06N 3/04 |
| 2020/0133741 A1* | 4/2020 | Lie | ............ | G06N 3/04 |
| 2020/0167654 A1* | 5/2020 | Guo | ............ | G06N 3/063 |

* cited by examiner

DATA FLOW-BASED NEURAL NETWORK MULTI-ENGINE SYNCHRONOUS CALCULATION SYSTEM

This application claims the priority of Chinese Patent Application No. 202010574436.7 filed with the China National Intellectual Property Administration on Jun. 22, 2020, the entire contents of which are incorporated herein by reference in this application.

TECHNICAL FIELD

This application relates to the technical field of neural networks, and for example, relates to a data flow-based neural network multi-engine synchronous calculation system.

BACKGROUND

A neural network acceleration system usually uses a plurality of calculation engines to calculate a plurality of calculation graphs at the same time, thus increasing the calculation frame rate of the system. When the plurality of calculation engines of the system work at the same time, each calculation engine has one data flow, and the plurality of data flows need to be synchronized to ensure that all the data flows work in the same state, thereby ensuring that the calculation results of the plurality of data flows are correct.

A typical method for synchronizing a plurality of data flows in related art includes: each calculation engine uses a state control module to monitor and control all sub-modules in the calculation engine, and then all the calculation engines feed their respective states back to a synchronization control module on a top layer; the synchronization control module collates and synchronizes the states of all the calculation engines, and also performs state exchange and synchronization with a shared module of all the calculation engines on the top layer; and the synchronization control module on the top layer sends a synchronization control signal to each calculation engine and the shared module after determining that all the calculation engines and the shared module are synchronized, so that the modules in each calculation engine can work and the data flow operation can proceed downwards.

However, the above technique of synchronizing a plurality of data flows may lead to an extremely complex synchronization control mechanism between the plurality of data flows, and also need to detect the state of each calculation module in each calculation engine at the same time, determine whether all the calculation engines and the shared module on the top layer are accurately synchronized according to the states of all the calculation engines and then send a control command to each calculation engine, which increases the time cost of synchronization control and affect the efficiency of parallel working of the plurality of data flows. Besides, the complex synchronization control mechanism leads to the complex design of the system, which requires the consumption of more logical resources, and the interconnection between the plurality of calculation engines is also complex, which makes the timing convergence in the circuit design of the system more difficult. Moreover, the system has poor expansibility, and the complexity of the synchronization control mechanism will increase when the number of calculation engines increases.

SUMMARY

This application provides a data flow-based neural network multi-engine synchronous calculation system, which can simply, efficiently and expansibly realize synchronization between a plurality of data flows during multi-engine calculation of the neural network.

Provided is a data flow-based neural network multi-engine synchronous calculation system, the system includes: a plurality of calculation engines, where each calculation engine includes a plurality of calculation modules and at least one cache module located at different layers, and each calculation module is configured to calculate an input calculation graph provided by the cache module or the calculation module of a previous layer of a layer where each calculation module is located, so as to obtain an output calculation graph; and at least one synchronization module, where each synchronization module is configured to monitor the data amount of the input calculation graph stored by the cache module on the same layer in each calculation engine, and control, when the data amount of the input calculation graph stored by each cache module on the same layer reaches a preset value corresponding to each cache module, each cache module on the same layer to output the stored input calculation graph to the calculation module on a next layer.

DETAILED DESCRIPTION

This application is described below with reference to the accompanying drawings and embodiments.

In addition, the terms "first", "second" and the like used in this specification may be used for describing various directions, actions, steps, or elements. However, these directions, actions, steps, or elements are not limited by the terms. These terms are only used for distinguishing a first direction, action, step, or element from another direction, action, step, or element. For example, without departing from the scope of this application, the first calculation module may be referred to as the second calculation module, and similarly, the second calculation module may be referred to as the first calculation module. The first calculation module and the second calculation module are both calculation modules, but they are not the same calculation module. The terms "first" and "second" shall not be construed as indicating or implying relative importance or implying a quantity of indicated technical features. Therefore, a feature limited by "first" or "second" may explicitly indicate or implicitly include one or more such features. In description of embodiments of this application, "plurality" means at least two, such as two and three unless it is specifically defined otherwise.

Embodiment 1

Figure 1:
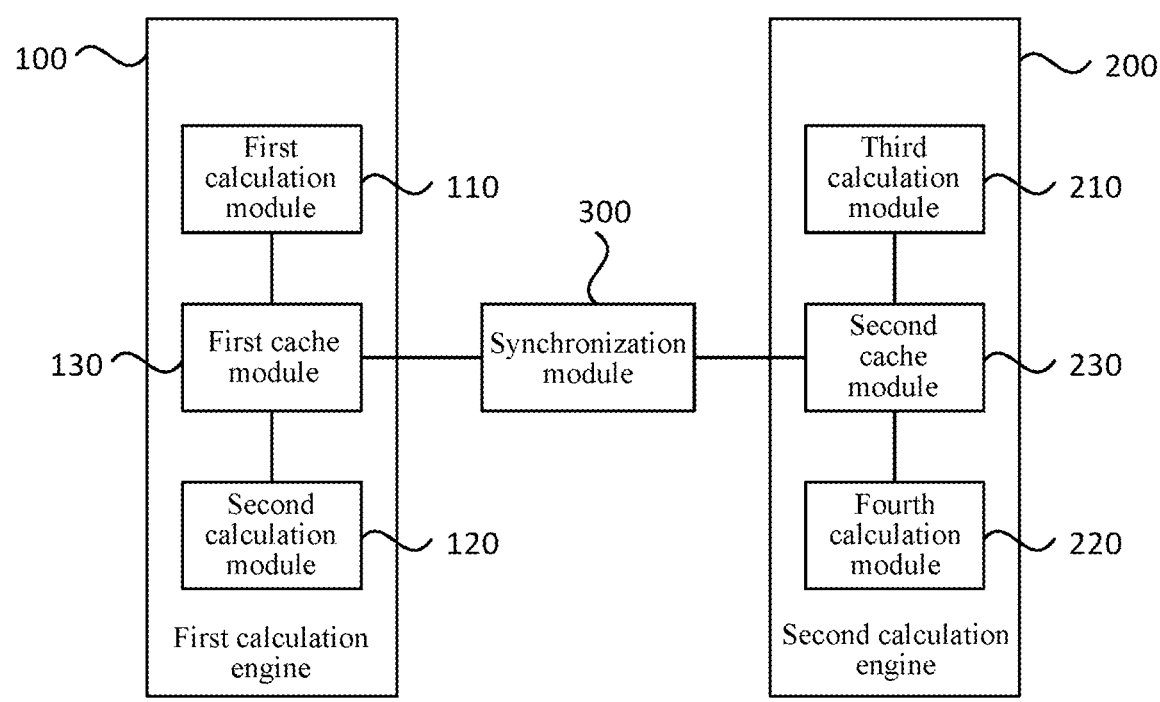
FIG. 1 is a schematic structural diagram of a data flow-based neural network multi-engine synchronous calculation system according to Embodiment 1 of this application.

As shown in FIG. 1, Embodiment 1 of this application provides a data flow-based neural network multi-engine synchronous calculation system, the system includes a plurality of calculation engines and at least one synchronization module 300.

Each calculation engine includes a plurality of calculation modules and at least one cache module located at different layers, and the calculation module is configured to calculate an input calculation graph provided by the cache module or the calculation module of a previous layer of a layer where the calculation module is located, so as to obtain an output calculation graph. Each synchronization module 300 corresponds to the plurality of cache modules on the same layer in the plurality of calculation engines. The synchronization module 300 is configured to monitor the data amount of the input calculation graph stored by the cache module on the same layer in each calculation engine, and control, when the data amount of the input calculation graph stored by each cache module on this layer reaches a corresponding preset value, each cache module to output the stored input calculation graph to the calculation module on a next layer.

In this embodiment, the system includes two calculation engines and one synchronization module 300. The two calculation engines are respectively a first calculation engine 100 and a second calculation engine 200. Each calculation engine includes two calculation modules and one cache module. The first calculation engine 100 includes two calculation modules and one cache module, namely a first calculation module 110, a second calculation module 120 and a first cache module 130. The first cache module 130 is arranged between the first calculation module 110 and the second calculation module 120. The second calculation engine 200 includes two calculation modules and one cache module, namely a third calculation module 210, a fourth calculation module 220 and a second cache module 230. The second cache module 230 is arranged between the third calculation module 210 and the fourth calculation module 220. The calculation path of the first calculation module 110, the first cache module 130 and the second calculation module 120 may be regarded as one data flow, and the calculation path of the third calculation module 210, the second cache module 230 and the fourth calculation module 220 may be regarded as another data flow. The first calculation module 110 and the third calculation module 210 may be regarded as calculation modules on the same layer, the first cache module 130 and the second cache module 230 may be regarded as cache modules on the same layer, and the second calculation module 120 and the fourth calculation module 220 may be regarded as calculation modules on the same layer.

Exemplarily, when the first calculation engine 100 and the second calculation engine 200 start calculation, an external input calculation graph is respectively input to the first calculation module 110 and the third calculation module 210, but the calculation speeds or the calculated data amounts of the first calculation module 110 and the third calculation module 210 may be different, so that the flow velocity may change, resulting in asynchronous data between the two data flows. In order to ensure the two data flows to work in the same state, the first cache module 130 is arranged between the first calculation module 110 and the second calculation module 120, and the second cache module 230 is arranged between the third calculation module 210 and the fourth calculation module 220. The output calculation graph calculated by the first calculation module 110 may be input and stored into the first cache module 130 as the input calculation graph of the second calculation module 120, and similarly, the output calculation graph calculated by the third calculation module 210 may be input and stored into the second cache module 230 as the input calculation graph of the fourth calculation module 220. The synchronization module 300 may monitor the data amount of the input calculation graph stored by the cache module on the same layer, i.e., monitor the data amounts of the input calculation graphs stored by the first cache module 130 and the second cache module 230. When the data amounts of the input calculation graphs stored by the first cache module 130 and the second cache module 230 both reach the corresponding preset values, or when the difference between the data amounts of the input calculation graphs stored by the first cache module 130 and the second cache module 230 is within a preset range, it is considered as the data flows are synchronous. At this time, the synchronization module 300 may control the first cache module 130 to input the stored input calculation graph therein to the second calculation module 120, and control the second cache module 230 to input the input calculation graph stored therein to the fourth calculation module 220. If the data flows are asynchronous, i.e., when the data amounts of the input calculation graphs stored by the first cache module 130 and the second cache module 230 do not reach the corresponding preset values, the synchronization module 300 may perform synchronization operation, and resume synchronization by suspending the data operation of the cache module with a higher flow velocity. Moreover, the synchronization module 300 may also perform synchronization operation when the difference between the data amounts of the input calculation graphs stored by the first cache module 130 and the second cache module 230 exceeds the preset range, thereby completing the synchronization operation between the two data flows of the first calculation engine 100 and the second calculation engine 200. Besides, the first cache module 130 and the second cache module 230 may also receive an external input calculation graph and transmit the external input calculation graph to the calculation module on the next layer according to the above method.

According to this embodiment of this application, each calculation engine of the plurality of calculation engines includes the plurality of calculation modules located at different layers and the at least one cache module, and the calculation module is configured to calculate the input calculation graph provided by the cache module or the calculation module of the previous layer of the layer where the calculation module is located, so as to obtain the output calculation graph. Each synchronization module of the at least one synchronization module corresponds to the plurality of cache modules on the same layer in the plurality of calculation engines. The synchronization module is configured to monitor the data amount of the input calculation graph stored by the cache module on the same layer in each calculation engine, and control, when the data amount of the input calculation graph stored by each cache module on this layer reaches the corresponding preset value, each cache module to output the stored input calculation graph to the calculation module on the next layer. In this way, this embodiment of this application solves the problems of low efficiency, high resource occupation, complex circuit design and poor expansibility during the synchronization of the plurality of data flows, and simply, efficiently and expansibly realizes the synchronization between the plurality of data flows during multi-engine calculation of the neural network.

Embodiment 2

Figure 2:
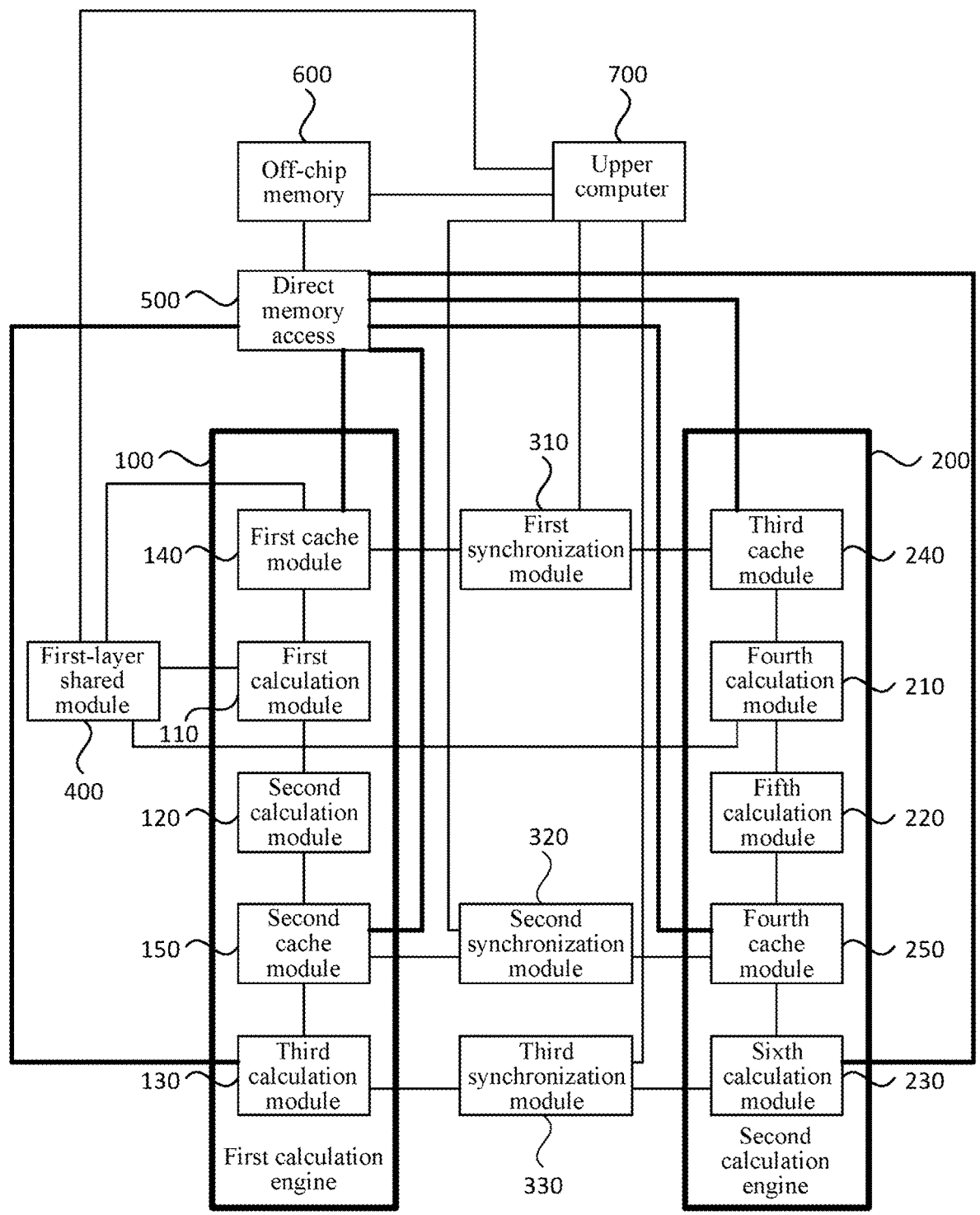
FIG. 2 is a schematic structural diagram of a data flow-based neural network multi-engine synchronous calculation system according to Embodiment 2 of this application.

As shown in FIG. 2, Embodiment 2 of this application provides a data flow-based neural network multi-engine synchronous calculation system. Embodiment 2 of this application is described based on Embodiment 1 of this application.

Based on Embodiment 1 of this application, Embodiment 2 of this application further performs synchronization operation on the start and end of calculation. In this embodiment, the at least one cache module includes a first-layer cache module, the at least one synchronization module includes a first-layer synchronization module, and the first-layer synchronization module is configured to monitor the data amount of the input calculation graph stored by the first-layer cache module in each calculation engine, and control, when the monitored data amount of the input calculation graph stored by each first-layer cache module reaches a corresponding preset value, each first-layer cache module to output the stored input calculation graph to the calculation module on the first layer. The at least one synchronization module further includes a bottom-layer synchronization module, and the bottom-layer synchronization module is configured to monitor the data amount of the output calculation graph obtained by the calculation module on the last layer in each calculation engine, and control, when the monitored data amount of the output calculation graph obtained by each calculation module on the last layer reaches a corresponding preset value, each calculation module on the last layer to output the obtained output calculation graph.

The system further includes a first-layer shared module 400, a direct memory access 500, an off-chip memory 600 and an upper computer 700. The first-layer shared module 400 is configured to monitor the data amount of the input calculation graph stored by the first-layer cache module of any calculation engine, and control, when the monitored data amount of the input calculation graph reaches a corresponding preset value, the calculation modules on the first layer in the plurality of calculation engines to start calculation. The direct memory access 500 is configured to send the input calculation graph to the first-layer cache module of each calculation engine and receive the output calculation graph output by the calculation module on the last layer in each calculation engine. The off-chip memory 600 is configured to send the input calculation graph to the direct memory access 500 and receive the output calculation graph sent by the direct memory access 500. The upper computer 700 is configured to control, after receiving a calculation instruction of a user, the off-chip memory 600 to start sending the input calculation graph to the first-layer cache module of each calculation engine, and also control each synchronization module to start monitoring the data amount of the input calculation graph stored by the cache module corresponding to the synchronization module or the output calculation graph obtained by the calculation module on the last layer.

In this embodiment, the system includes two calculation engines and three synchronization modules. The two calculation engines are a first calculation engine 100 and a second calculation engine 200. The three synchronization modules are a first synchronization module 310, a second synchronization module 320 and a third synchronization module 330. Each calculation engine includes three calculation modules and two cache modules. The first calculation engine 100 includes three calculation modules and two cache modules, namely a first calculation module 110, a second calculation module 120, a third calculation module 130, a first cache module 140 and a second cache module 150. The first cache module 140 is arranged on a previous layer of the first calculation module 110. The second cache module 150 is arranged between the second calculation module and the third calculation module 130. The second calculation engine 200 includes three calculation modules and two cache modules, namely a fourth calculation module 210, a fifth calculation module 220, a sixth calculation module 230, a third cache module 240 and a fourth cache module 250. The third cache module 240 is arranged on a previous layer of the fourth calculation module 210. The fourth cache module 250 is arranged between the fifth calculation module 220 and the sixth calculation module 230. The calculation path of the first cache module 140, the first calculation module 110, the second calculation module 120, the second cache module 150 and the third calculation module 130 may be regarded as one data flow, and the calculation path of the third cache module 240, the fourth calculation module 210, the fifth calculation module 220, the fourth cache module 250 and the sixth calculation module 230 may be regarded as another data flow. The first cache module 140 and the third cache module 240 may be regarded as cache modules on the same layer. The first calculation module 110 and the fourth calculation module 210 may be regarded as calculation modules on the same layer. The second calculation module 120 and the fifth calculation module 220 may be regarded as the calculation modules on the same layer. The second cache module 150 and the fourth cache module 250 may be regarded as cache modules on the same layer. The third calculation module 130 and the sixth calculation module 230 may be regarded as calculation modules on the same layer. The first cache module 140 and the third cache module 240 are the first-layer cache modules, the first synchronization module 310 is the first-layer synchronization module, and the third synchronization module 330 is the bottom-layer synchronization module.

Exemplarily, when the first calculation engine 100 and the second calculation engine 200 starts calculation, i.e., after the upper computer 700 receives a calculation instruction of a user, the upper computer 700 may control the off-chip memory 600 to start sending the input calculation graph to the first cache module 140 and the third cache module 240 through the direct memory access 500, and at the same time, control the first synchronization module 310 to start monitoring the data amounts of the input calculation graphs stored in the first cache module 140 and the third cache module 240 and control the first-layer shared module 400 to start monitoring the data amount of the input calculation graph stored in the first cache module 140. When the data amounts of the input calculation graphs stored by the first cache module 140 and the third cache module 240 both reach the corresponding preset values, or when the difference between the data amounts of the input calculation graphs stored by the first cache module 140 and the third cache module 240 is within a preset range, the first synchronization module 310 may control the first cache module 140 to input the input calculation graph stored therein into the first calculation module 110 and control the third cache module 240 to input the input calculation graph stored therein into the fourth calculation module 210, and the first-layer shared module 400 may control the first calculation module 110 and the fourth calculation module 210 to start calculation. At this time, the first-layer shared module 400 and the data flows are all synchronous. If the data flows are asynchronous, i.e., when the data amounts of the input calculation graphs stored by the first cache module 140 and the third cache module 240 do not reach the corresponding preset values, the first synchronization module 310 may perform synchronization operation by suspending the data operation of the cache module with a higher flow velocity. Moreover, the first synchronization module 310 may also perform synchronization operation when the difference between the data amounts of the input calculation graphs stored by the first cache module 140 and the third cache module 240 exceeds the preset range, thereby completing the synchronization operation at the start of the calculation between the two data flows of the first calculation engine 100 and the second calculation engine 200.

In addition to the input calculation graph output by the calculation module of the previous layer, the third calculation module 130 and the sixth calculation module 230 may need the input calculation graph from the off-chip memory 600 during calculation, so the second cache module 150 and the fourth cache module 250 may also receive the input calculation graph from the off-chip memory 600 through the direct memory access 500. There is no need of the input calculation graph from the off-chip memory 600 between the first calculation module 110 and the second calculation module 120 and between the fourth calculation module 210 and the fifth calculation module 220, so there may be no cache module arranged between the first calculation module 110 and the second calculation module 120 and between the fourth calculation module 210 and the fifth calculation module 220 to perform synchronization. Besides, the synchronization during calculation is the same as that in Embodiment 1 of this application, and will not be repeated here in this embodiment of this application. During the calculation, each calculation engine may include more calculation modules, and correspondingly add cache modules and synchronization modules, but their synchronization methods are the same as above.

When the calculation of the first calculation engine 100 and the second calculation engine 200 respectively reaches the calculation module on the last layer, i.e., the third calculation module 130 and the sixth calculation module 230, the third synchronization module 330 may monitor the data amounts of the output calculation graphs obtained by the third calculation module 130 and the sixth calculation module 230. When the data amount of each output calculation graph reaches the corresponding preset value, the third synchronization module 330 may control the third calculation module 130 and the sixth calculation module 230 to output the obtained output calculation graphs to the off-chip memory 600 through the direct memory access 500. At this time, whether the data flows are synchronous or asynchronous, the synchronization method is the same as that between the first cache module 140 and the third cache module 240, and will not be repeated here in this embodiment of this application.

Optionally, the synchronization module includes a counter. The first synchronization module 310, the second synchronization module 320 and the third synchronization module 330 all monitor the data amounts of the input calculation graph stored by the plurality of cache modules through the counter arranged therein. The system may further include more calculation engines. The number of counters is the same as that of the calculation engines. Each counter is used for monitoring one calculation engine. The cache module is a First Input First Output (FIFO) memory, which can increase the data transmission rate, process a large number of data flows and be matched with systems having different transmission rates. The cache module is applicable to the data flow-based neural network multi-engine synchronous calculation system.

According to this embodiment of this application, the data flow is split into a plurality of parts by the cache modules, and the plurality of parts independently perform simplified synchronization operation synchronously. The small cache module is added to the previous layer of each calculation module in the data flow to directly monitor the data amount in the cache module so as to determine the synchronization state of each layer of data flow. One data flow is used as a base to synchronize all the data flows, which simplifies the synchronization operation between the data flows. When the number of data flows is increased, as long as the number of counters in the synchronization modules is increased, the synchronization can be realized simply and conveniently by the same method as described above, thereby improving the efficiency of parallel working of the data flows, reducing the resource consumption produced by the synchronization operation, facilitating the timing convergence in the overall design of the system and increasing the expansibility of the system.

What is claimed is:

1. A data flow-based neural network multi-engine synchronous calculation system, comprising:
   a plurality of calculation engines, wherein each calculation engine comprises a plurality of calculation modules and at least one cache module located at different layers, and wherein each of the plurality of calculation modules is configured to calculate an input calculation graph provided by the at least one cache module or by the calculation module of a preceding layer of the same calculation engine, to obtain an output calculation graph; and
   at least one synchronization module, wherein each synchronization module is configured to monitor a data amount of the input calculation graph stored by each cache module of the same layer across the plurality of calculation engines, and control, when the data amount of the input calculation graph stored in each cache module reaches a preset value corresponding to that cache module, each cache module on the same layer to output the stored input calculation graph to the calculation module in a next layer of the same calculation engine, wherein the at least one synchronization module is configured to monitor the data amounts of the input calculation graphs stored by a first-layer cache module of the at least one cache module and a second-layer cache module of the at least one cache module, and when the difference between the data amounts of the input calculation graphs stored by the first-layer cache module and the second-layer cache module is within a respective preset range, data flows are synchronous.

2. The system according to claim 1, wherein the at least one synchronization module comprises a first-layer synchronization module, and the first-layer synchronization module is configured to monitor the data amount of the input calculation graph stored by the first-layer cache module in each calculation engine, and control, when the monitored data amount of the input calculation graph stored by each first-layer cache module reaches a preset value corresponding to each first-layer cache module, each first-layer cache module to output the stored input calculation graph to the calculation module on the first layer.

3. The system according to claim 2, further comprising:
   a first-layer shared module, configured to monitor the data amount of the input calculation graph stored by the first-layer cache module of one calculation engine, and control, when the monitored data amount of the input calculation graph reaches a preset value corresponding to the first-layer cache module of the one calculation engine, the calculation modules on the first layer in the plurality of calculation engines to start calculation.

4. The system according to claim 2, wherein the at least one synchronization module further comprises a bottom-layer synchronization module, and the bottom-layer synchronization module is configured to monitor a data amount of the output calculation graph obtained by the calculation module on a last layer in each calculation engine, and control, when the monitored data amount of the output calculation graph obtained by each calculation module on the last layer reaches a preset value corresponding to each calculation module on the last layer, each calculation module on the last layer to output the obtained output calculation graph.

5. The system according to claim 1, wherein each synchronization module comprises a counter, and the counter is configured to monitor the data amount of the input calculation graph stored by the cache module corresponding to each synchronization module.

6. The system according to claim 5, wherein the number of the counters is the same as that of the plurality of calculation engines.

7. The system according to claim 1, wherein the at least one cache module is a First Input First Output (FIFO) memory.

\* \* \* \* \*